US010893084B2

(12) United States Patent
Dhanabalan (10) Patent No.: US 10,893,084 B2
(45) Date of Patent: Jan. 12, 2021

(54) BANDWIDTH EFFICIENT STREAMING AND SYNCHING MULTIMEDIA CONTENT AT A DESIRED QUALITY OF EXPERIENCE

(71) Applicant: Citrix Systems, Inc., Fort Lauderdale, FL (US)

(72) Inventor: Praveen Raja Dhanabalan, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 51 days.

(21) Appl. No.: 16/111,571

(22) Filed: Aug. 24, 2018

(65) Prior Publication Data

US 2020/0068000 A1   Feb. 27, 2020

(51) Int. Cl.
*H04L 29/06* (2006.01)
*H04L 29/08* (2006.01)

(52) U.S. Cl.
CPC ........ *H04L 65/4092* (2013.01); *H04L 65/604* (2013.01); *H04L 65/608* (2013.01); *H04L 65/80* (2013.01); *H04L 67/1095* (2013.01); *H04L 67/42* (2013.01)

(58) Field of Classification Search
CPC ..... G06F 13/00; G06Q 30/02; G11B 20/1262; G11B 20/10527; G11B 2020/10537; H04L 29/08117; H04L 65/60; H04L 29/06; H04L 29/0809; H04L 29/08072; H04L 29/08; H04L 65/604; H04L 65/4092; H04L 67/42; H04L 67/1095; H04L 65/80; H04L 65/608; H04N 21/434; H04N 21/6373; H04N 21/23439; H04N 21/26258; H04N 21/44209; H04N 21/85406

USPC ......................................................... 709/219
See application file for complete search history.

(56) References Cited

U.S. PATENT DOCUMENTS

| | | |
|---|---|---|
| 2011/0082914 A1 | 4/2011 | Robert et al. |
| 2012/0005368 A1 | 1/2012 | Knittle |
| 2014/0189064 A1* | 7/2014 | Cilli ................. H04N 21/23439 709/219 |

OTHER PUBLICATIONS

Oct. 25, 2019—(WO) International Search Report and Written Opinion—App PCT/US2019/045727.

* cited by examiner

*Primary Examiner* — Robert B Harrell
(74) *Attorney, Agent, or Firm* — Banner & Witcoff, Ltd.

(57) ABSTRACT

Methods and systems for bandwidth efficient streaming and synching multimedia content at a desired quality of experience are described herein. One method includes: requesting, by a client device and from a server device, a multimedia file for streaming; receiving, at the client device and responsive to the request, a plurality of chunks of the multimedia file, wherein the chunks are of varying quality; streaming the multimedia file based on the received plurality of chunks; determining a first subset of the plurality of chunks that meet a predefined quality threshold, and a second subset of the plurality of chunks that do not meet the predefined quality threshold; requesting, by the client device and from the server device, a replacement chunk for each chunk of the second subset, wherein each replacement chunk meets the predefined quality threshold; and storing the multimedia file using the first subset and the replacement chunks.

20 Claims, 6 Drawing Sheets

*FIG. 6*

BANDWIDTH EFFICIENT STREAMING AND SYNCHING MULTIMEDIA CONTENT AT A DESIRED QUALITY OF EXPERIENCE

FIELD

Generally, aspects described herein relate to computers, software, and networking. More specifically, aspects described relate to adaptive bit rate synchronization and/or streaming of multimedia or other data files over a network.

BACKGROUND

Users of various devices (e.g., smartphones, desktops, laptops, iPads, etc.) may often want to play (e.g., view, watch, listen to, etc.) a multimedia content while simultaneously obtaining it, e.g., streaming while downloading or file sharing. Users who stream a multimedia content (e.g., YouTube videos) may differ from users who wish to first obtain the entire file for the multimedia content before playing the multimedia file. Since devices may have limited bandwidth and/or network connectivity, users may not be able to stream a multimedia content at an ideal or desired quality. For example, if a user device enters a phase of limited bandwidth, for example, due to a simultaneous downloading of the multimedia content file, the user device may not have the requisite bandwidth to present a multimedia content stream for the user to play at an ideal or desired quality concurrently with the streaming playback.

Rather than preventing users from streaming the multimedia content in such scenarios, some content providers, service providers, and network providers have used techniques to allow users to stream certain segments or "chunks" of multimedia content on at least a compromised quality whenever the user device enters a phase of lower bandwidth or network connectivity. One such technique, adaptive bit rate streaming (ABR), may facilitate the delivery of chunks of multimedia content to the user device for the user to stream in qualities that vary based on the available bandwidth of the user device. However, these existing techniques to overcome a low bandwidth or network connectivity may nevertheless impede a user's ability to eventually obtain and store (e.g., "sync" or "synch") an ideal or desired quality of the multimedia content, e.g. one with all data at the desired bit rate.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards bandwidth efficient streaming and synching of multimedia content at a desired quality of experience (QoE)

One method comprises: receiving, at the a client device and responsive to the request, a multimedia file from a server device, the multimedia file including a plurality of chunks of the multimedia file, wherein the chunks are of varying quality; streaming the multimedia file based on the received plurality of chunks; determining, by the client device, a first subset of the plurality of chunks that meet a predefined quality threshold, and a second subset of the plurality of chunks that do not meet a the predefined quality threshold; receiving, by the client device and from the server device, a replacement chunk for each chunk of the second subset, wherein each replacement chunk meets the predefined quality threshold; and storing the multimedia file using the first subset and the replacement chunk for each chunk of the second subset.

Another method comprises: receiving, by a server device and from a client device, a request to stream a multimedia file hosted by the server device; transmitting, from the server device to the client device, the multimedia file as a plurality of chunks, wherein the chunks are of varying quality responsive to feedback regarding the client device's available bandwidth; receiving, by the server device and from the client device, a request to download a replacement chunk for a previously successfully transmitted chunk, wherein the previously successfully transmitted chunk did not meet a quality threshold; and transmitting, from the server device to the client device, the replacement chunk, wherein the replacement chunk meets the quality threshold.

In accordance with other embodiments of the present disclosure, a system comprises: one or more processors; and memory storing computer-executable instructions that, when executed by the one or more processors, cause the system to: receive, at a client device, a multimedia file from a server device, the multimedia file including a plurality of chunks, wherein the chunks are of varying quality; stream the multimedia file based on the received plurality of chunks; determine, by the client device, a first subset of the plurality of chunks that meet a quality threshold, and a second subset of the plurality of chunks that do not meet the quality threshold; receive, by the client device from the server device, a replacement chunk for each chunk of the second subset, wherein each replacement chunk meets the quality threshold; and store the multimedia file using the first subset and the replacement chunk for each chunk of the second subset.

In accordance with other embodiments of the present disclosure, one or more non-transitory computer readable media stores computer-executable instructions. When these computer-executable instructions are executed by a computing device, the computing device may perform a method that comprises: receiving, at the a client device and responsive to the request, a multimedia file from a server device, the multimedia file including a plurality of chunks of the multimedia file, wherein the chunks are of varying quality; streaming the multimedia file based on the received plurality of chunks; determining, by the client device, a first subset of the plurality of chunks that meet a predefined quality threshold, and a second subset of the plurality of chunks that do not meet a the predefined quality threshold; receiving, by the client device and from the server device, a replacement chunk for each chunk of the second subset, wherein each replacement chunk meets the predefined quality threshold; and storing the multimedia file using the first subset and the replacement chunk for each chunk of the second subset.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

At least some embodiments of the present disclosure address the shortcomings and issues discussed above to describe systems and methods for bandwidth efficient synchronization and/or streaming of multimedia content at a desired quality. Furthermore, various embodiments of the present disclosure expand these systems and methods over a variety of system environments, including standalone, networked, remote-access (also known as remote desktop), virtualized, and/or cloud-based environments, among others.

As a general introduction to the subject matter described in more detail below, aspects described herein are directed towards bandwidth efficient systems and methods to stream multimedia content, and synchronize the content at a desired quality. One or more servers, computing devices, or platforms may receive a request from an end user for a multimedia content, retrieve the multimedia content, and split it into multiple chunks of varying quality (e.g., 480×360 pixels ("360p"), 640×480 pixels ("480p"), 1024×720 pixels ("720p"), 1920×1080 pixels ("1080p"), etc.), e.g., using an adaptive bit rate (ABR) techniques. The servers, computing devices, or platforms may customize delivery of the multimedia content for the end user to stream based on the end user device's bandwidth and network connectivity. For example, based on feedback from the end user device regarding the network experience of the end user device as it streams a chunk of multimedia content that the server had previously sent, the server may then determine what the quality of the next chunk should be, before the chunk of that quality is sent to the end user device. Thus, if the current chunk of a multimedia content that a user is streaming is 720p and the user experiences delivery or quality issues because of low bandwidth, the server may determine that the next chunk should be delivered at 480p. However, if the user device had sufficient bandwidth while the user was streaming the 720p chunk, the server might determine that the next chunk should be delivered in a higher quality, e.g., 1080p. Thus, ABR provides the user with at least a manageable quality of experience for streaming, as it allows the server to dynamically deliver the multimedia content based on a user's available bandwidth. However, ABR might not ensure that the user would be able to store the complete multimedia file, e.g., synchronize the multimedia file, at an ideal or desired quality (e.g., 1080p).

In at least some aspects described herein, an end user device may determine that chunks of a multimedia content delivered to an end user device do not meet a desired or ideal quality. During an "idle time," for example, a time during which the end user device may have optimal network connectivity and bandwidth, or during which the end user device has not allotted its network bandwidth for any other significant transmission of data, the end user device may send requests to replace these chunks with those having the desired or higher quality. The requests may be received and executed by one or more servers, computing devices, or applications described herein. In further embodiments, the determination that chunks delivered to an end user device do not meet a desired or ideal quality may be performed externally, e.g., at the one or more servers, computing devices, or application. As a result, end users may enjoy streaming multimedia content on their user device using bandwidth efficient streaming techniques, while ensuring that the multimedia content eventually synchronizes at a desired quality, regardless of the bandwidth of the user device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
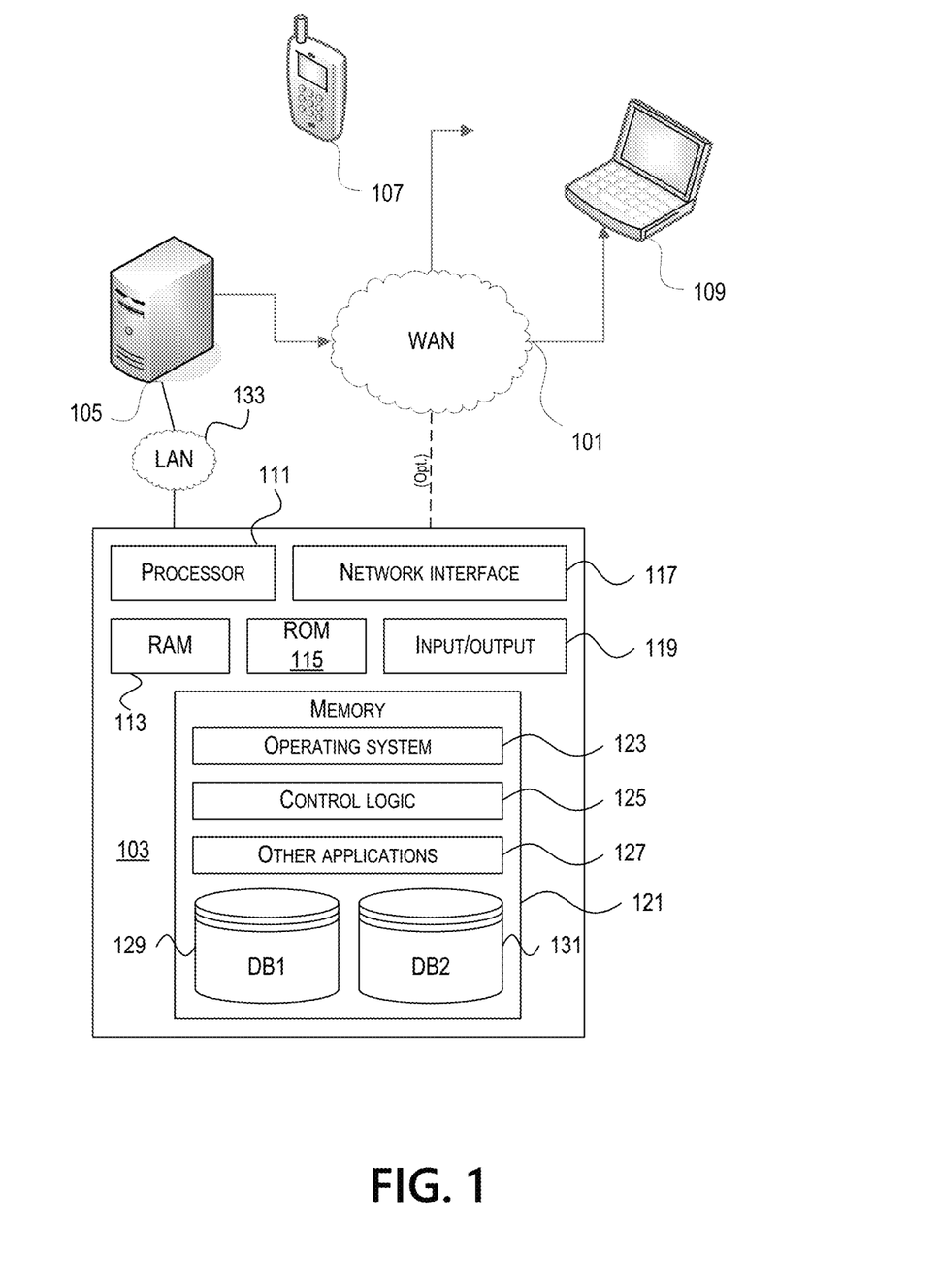
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data (e.g., multimedia content) as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. Other application software 127 may include, for example, a module for receiving multimedia content and generating a plurality of chunks in various qualities, and/or an encoder to digitize the multimedia content and/or chunks. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 (e.g., "DB1") and a second database 131 (e.g., "DB2"). In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. For example, devices 105, 107, and 109 may also have memory that may include a first data structure and a second data structure to store data used in performance of one or more aspects described herein. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
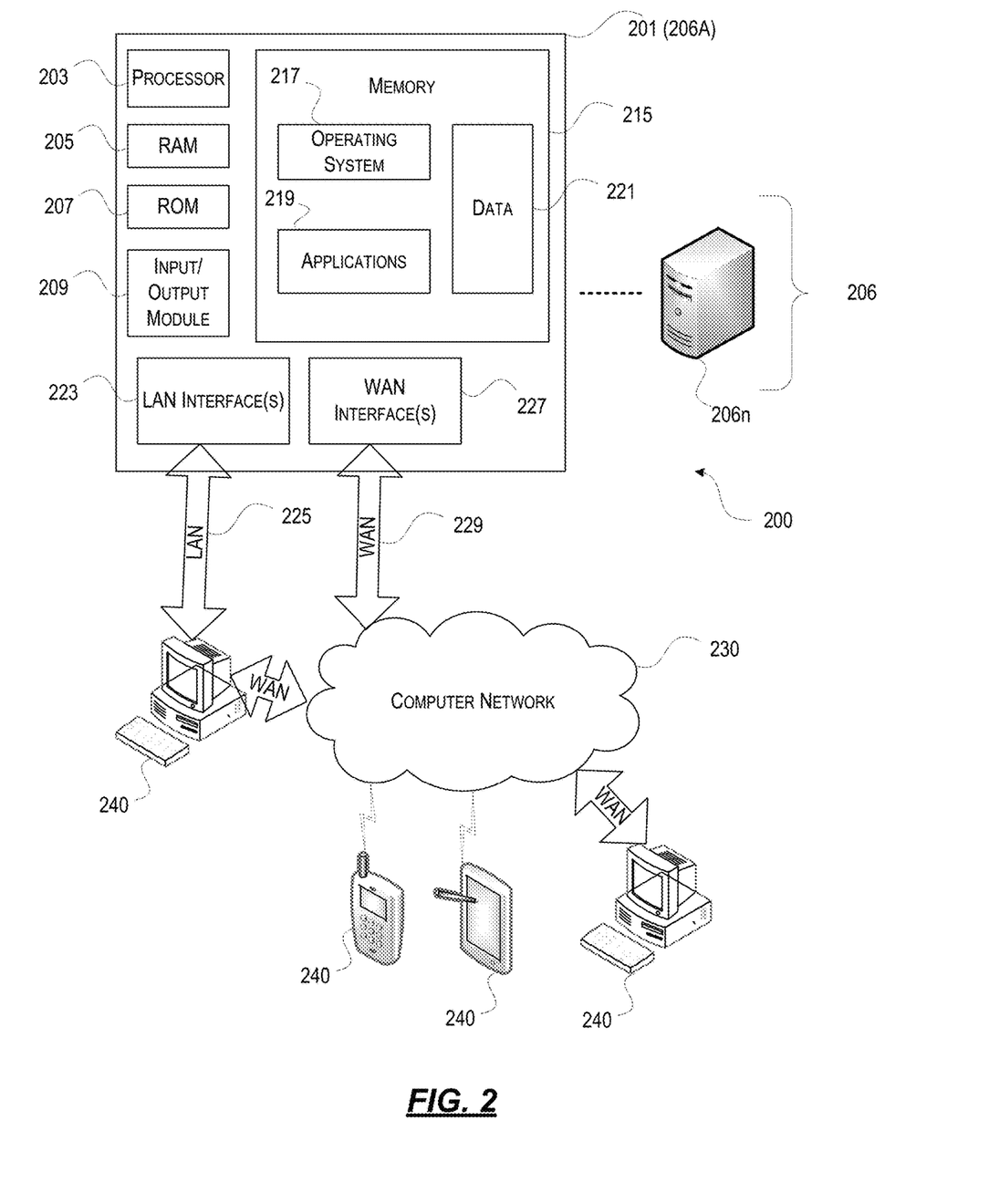
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)), through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221. Application programs 219 may include, for example, a module for receiving multimedia content and generating a plurality of chunks in various qualities, and/or an encoder to digitize the multimedia content and/or chunks.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), management server(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window.

In one example, the application is a bandwidth efficient multimedia content streaming and synchronizing application, as described in various embodiments presented herein. Client device 240 may execute a receiver program that may receive chunks of a multimedia content to stream based on the bandwidth and networking capacity of client device 240, while communicating with one or more server(s) 206a-206n to receive a desired quality of the multimedia content for synchronization and/or storage. Such embodiments may allow the multimedia content uploaded by a server 201 to be synchronized and/or stored at the client device 240 in the same quality (e.g., highest quality), even if there is poor network connection or bandwidth of a client device 240 during the uploading and/or streaming of the multimedia content.

In another example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) For example, first server 206a (e.g., a multimedia content provider) may receive a request for a multimedia content from the client machine 240, but then deliver the multimedia content to second server 206b (e.g., a management server) to digitize, process into chunks, and/or deliver to client machine 240 for streaming and/or syncing using methods described herein.

In some embodiments, a first server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Bandwidth Efficient Video Syncing and Streaming with Good QoE

Figure 3:
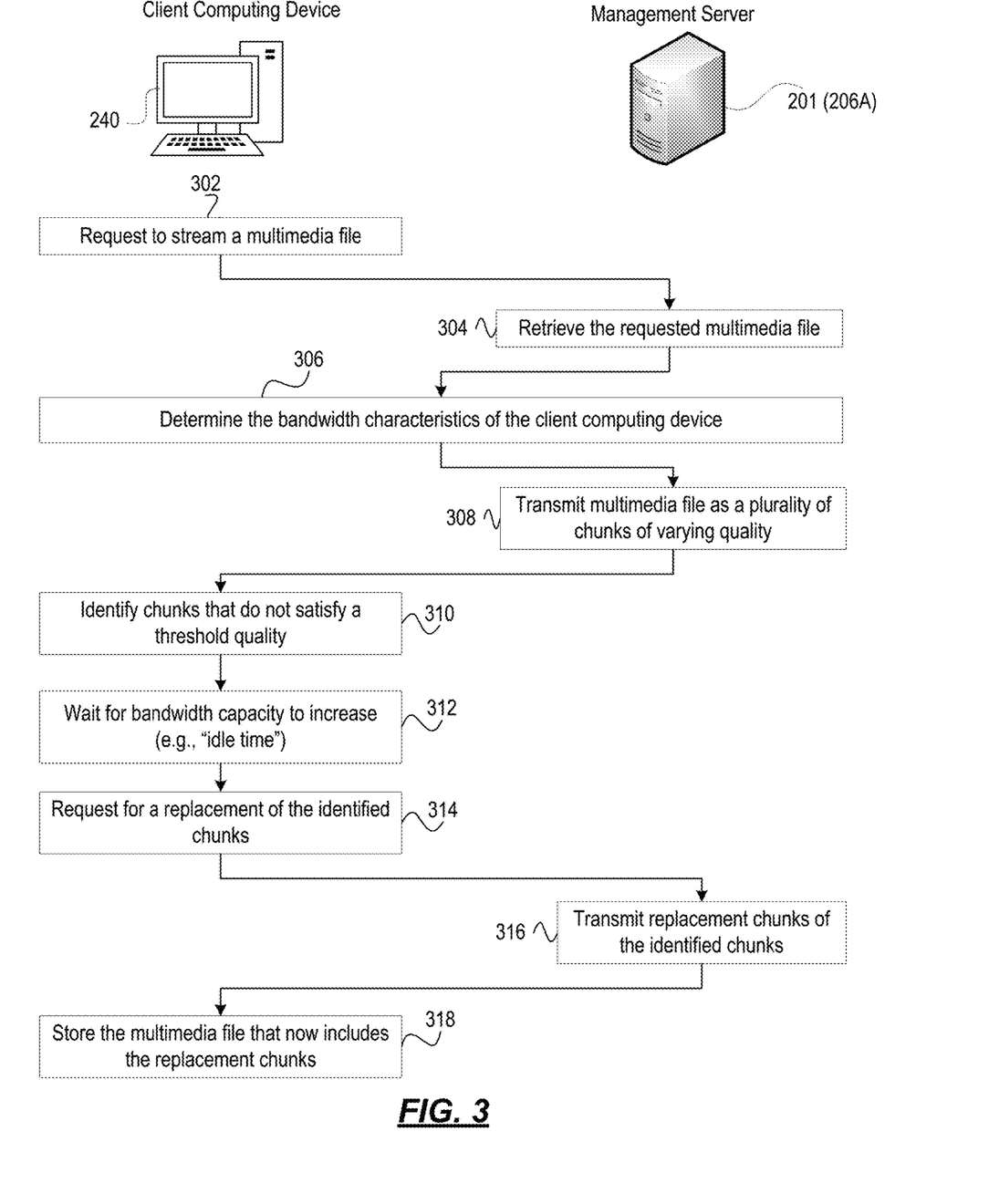
FIG. 3 depicts an illustrative process flow diagram for a bandwidth efficient method to stream and sync multimedia content at a desired quality of experience (QoE).

FIG. 3 depicts an illustrative flow diagram for a bandwidth efficient method to sync as well as stream a multimedia content at a desired quality of experience (QoE). In various embodiments, QoE may refer to a measure of an end user's satisfaction of viewing a multimedia content. In at least some embodiments, the QoE may be measured based on the quality of the multimedia content that is synced and/or streamed, e.g., as measured by the bit rate of the multimedia content.

Step 302 may include a request for a multimedia file, by illustrative client computing device 240. The request may be transmitted wirelessly to management server(s) 206a-206n, or a like computing system or server 201.

In some embodiments, at step 304, management server 201 may retrieve the requested multimedia file using one or more computer servers 206a-206n, e.g., from storage 215. For example, a first server 206a may receive the request for the multimedia file, and communicate with a second server 206b that may be a provider of the multimedia content to deliver the multimedia content to the first server 206a (or a third server of 206c-n) to digitize and/or generate a plurality of chunks of the multimedia content.

Step 308 may include a transmission of the multimedia file as a plurality of chunks of varying quality. The plurality of chunks may be transmitted by management server 201 to client computing device 240. In various embodiments, a "chunk" may refer to a portion of the multimedia content having a predetermined length of time, file size, number of frames, etc. In some embodiments, the length of time and/or file size may be set by client computing device 240 or the management server 201. Alternatively or additionally, the length of time or file size may be based on standards set by the multimedia content provider. For example, in one embodiment, the plurality of chunks may each use identical time indices. In such an embodiment, each of the plurality of chunks may be of a similar duration. In some embodiments, each chunk of the plurality of chunks may have a given encoding bitrate. The chunks may be encoded having varying bitrates, for example, based on the varying quality of the chunk. Thus, a chunk of a higher quality may have a higher bitrate, and vice versa.

Figure 5:
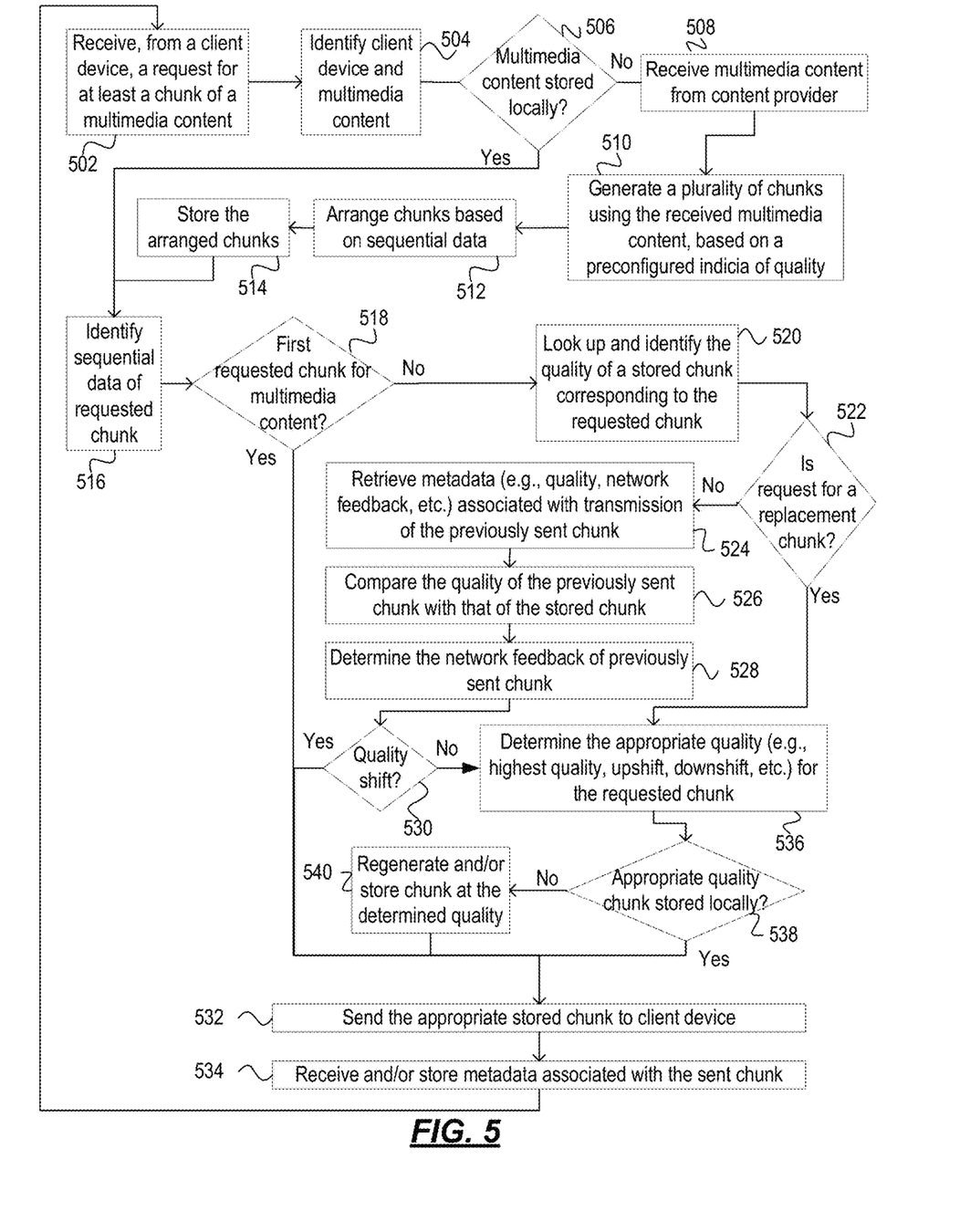
FIG. 5 depicts an illustrative block diagram for a bandwidth efficient method to stream and sync multimedia content at a desired quality of experience (QoE) performed by one or more servers or computing devices, in accordance with one or more illustrative aspects described herein.

The transmission of the chunks may be in the form of a stream sent to a client, for example wirelessly, using adaptive bit rate (ABR) technology, by management server 201. In some embodiments, prior to or concurrent with the transmission of the multimedia file, management server 201 may determine the client computer's bandwidth and/or CPU capacity in real time and adjust the quality of the multimedia transmission stream accordingly, e.g., as in step 306. At least some embodiments of a process by which management server 201 may facilitate the transmission of the multimedia file, based on adaptive bit rate technology, may be further described in method 500, as depicted in FIG. 5.

Step 310 may include identifying the chunks of the plurality of chunks that do not satisfy a threshold of quality. In some embodiments, the threshold of quality may refer to a minimum metric of quality at which the client device may be willing to sync the chunk without having to request a replacement chunk, as will be described herein. This threshold may be predetermined and/or may be configured by a user. For example, a user may configure the client device such that a multimedia content that is eventually synced has a desired quality that is at the configured threshold of quality. Furthermore, the quality may be measured using objective quantifiable indicia, e.g., pixels, a number or duration of buffer stalls, bit rate shifts, audio bit depth, etc. In some embodiments, step 706 may further involve categorizing the chunks based on varying levels of quality. For example, chunks may be sorted based on one or more of the following categories: those that are below 360p those that are between 360p to 480p, those that are between 480p to 720p, those that are between 720p to 1080p, and those that are 1080p or higher. It is contemplated that other categorizations (e.g., "file structures") based on quality may also exist. In one embodiment, the threshold for an ideal quality may be 1080p.

Step 312 may include waiting for the client computing device 240 to reach "idle time." As known to those having ordinary skill in the art, an idle time may commence when the bandwidth capacity of the client computing device increases, e.g., by freeing up from a previous activity that occupied it. For example, if a user pauses or stops the streaming of a multimedia content, the bandwidth capacity of the client computing device 240 may increase. In some embodiments, there may be a threshold of bandwidth capacity, at which the client computing device 240 may be deemed to be at "idle time." For example, in some embodiments, the threshold may be predetermined or preconfigured. The threshold of bandwidth capacity may refer to a minimum bandwidth capacity for the client device to be able to request and/or receive a replacement of identified chunks from the management server, as may be described herein. In one further embodiment, client computing device 240 may be deemed to enter "idle time" if an amount of time has lapsed during which a multimedia content is not streaming.

Step 314 may include a request for a replacement of the identified chunks that do not satisfy the threshold of quality. The request may be sent wirelessly by the client computer to server(s) 206a-n. In one or more embodiments, the request may be sent directly to a computer server that is a provider of the multimedia content (e.g., one or more computer servers 206a-n or management server 201).

Step 316 may include a transmission of the replacement chunks. The replacement chunks may be a higher quality version of the identified chunks that did not satisfy the threshold quality. The higher quality may be an automatic result of the management server determining that the client computer has a higher bandwidth capacity, and adjusting the quality of the chunks accordingly.

For example, if management server receives a request to replace an identified chunk that has a quality of 480p, management server 201 may query the client computing device for its bandwidth capacity. The management server 201 may determine that the client computer has the bandwidth capacity to be able to receive a replacement chunk having a quality of 720p but does not yet have the bandwidth capacity to receive a replacement chunk having a quality of 1080p. Based on this determination, management server 201 may send a replacement chunk of 720p.

In further embodiments, the one or more components of the system may be configured to send replacement chunks, if at all, when the client computer has the bandwidth capacity to receive a replacement chunk that has a level of quality that is at least better than the identified chunk that is being replaced, and preferably at a desired quality level. For example, if the client computer had identified a chunk of the multimedia content having a quality that was below 480p at step 306, the management server at step 312 may transmit a replacement chunk having a quality that is at least 480p. In some embodiments, there may be a second threshold for determining what would constitute a satisfactory replacement chunk. The second threshold may be a minimum quality, e.g., bit rate, for a replacement chunk to be considered satisfactory by the client computing device, e.g., to be used for syncing the multimedia content. Thus, the threshold used by the client device for identifying chunks that do not meet a quality level may be different from the threshold used by the management server for the quality level of the replacement chunk. For example, a client device may identify any chunks below 480p as not meeting a desired quality level but request for replacement chunks having a quality level that is at least 1080p.

Step 318 may include storage of the multimedia file using the replacement chunks, along with chunks that were already of the desired or ideal quality. In various embodiments, the storage of the entire multimedia content, as originally requested by client computing device 240, may be referred to as "synchronization," "synchronizing," and/or "syncing." It is contemplated that the synced file in a memory of client computing device 240 would be of at least the same quality as the multimedia content originally shared by the multimedia content provider.

Figure 4:
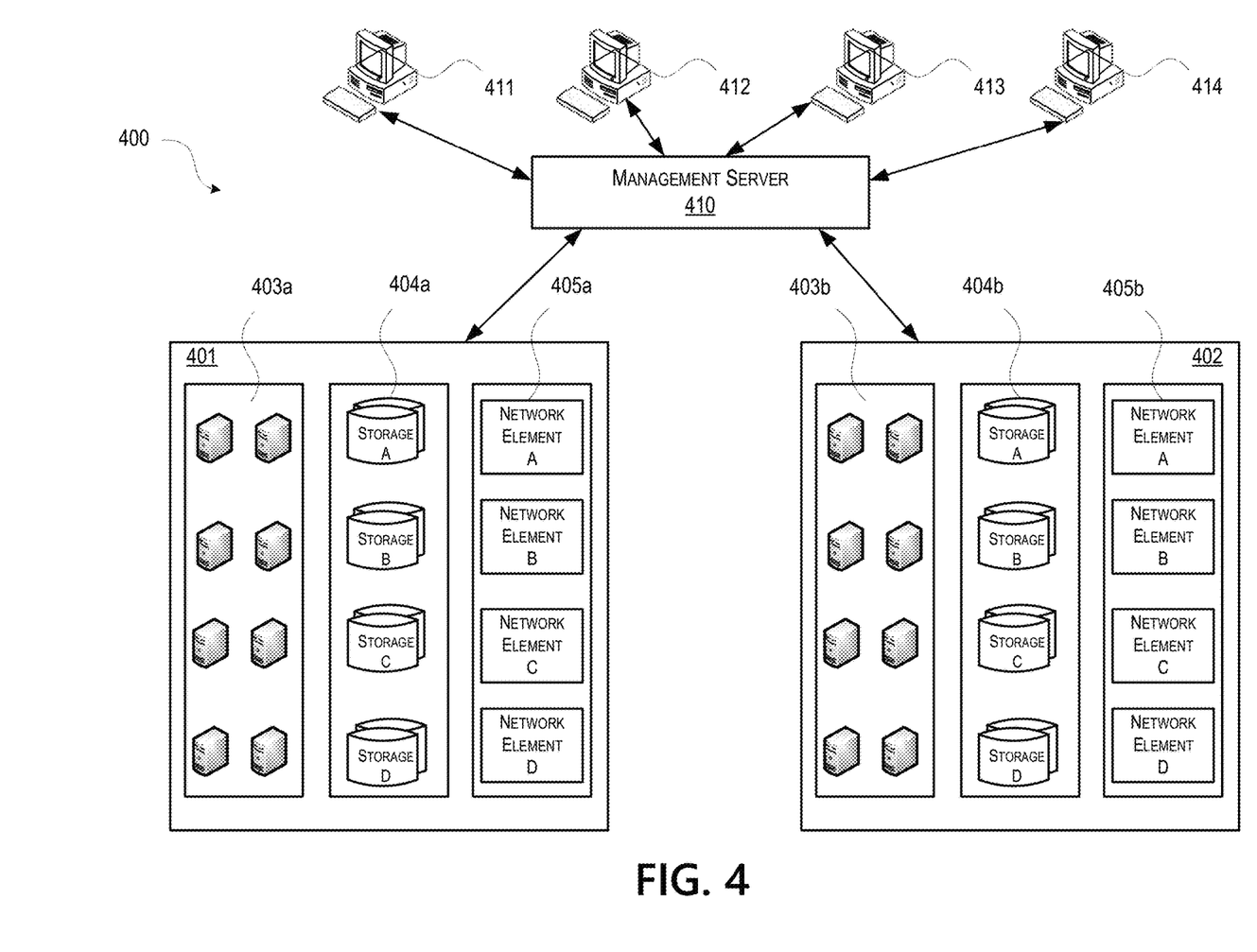
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

FIG. 5 depicts an illustrative flow chart for a bandwidth efficient method (e.g., method 500) to stream and sync multimedia content at a desired quality of experience (QoE) performed by one or more servers or computing devices, in accordance with one or more illustrative aspects described herein. In some embodiments, method 500 may be performed by management server 410, as depicted in FIG. 4, and/or by device or server 201, as depicted in FIG. 2, to facilitate streaming and syncing of multimedia content by client devices 411-414 or client machines 240, respectively, according to methods presented herein.

In an illustrative embodiment, step 502 may include receiving a request for at least a chunk of a multimedia content. The request may be received from one or more client computing devices 411-414 or 240.

Step 504 may include identifying the client device and the requested multimedia content. In one or more embodiments, identifying the client device may involve comparing received client device information with a repository or database of stored device information of a plurality of devices. The database or repository may be formed by storing device identification information of the plurality of client devices 411-414 to memory or data structure 404, and indicating the requested multimedia content to the memory or data structure 404 for reference. The requested multimedia content may be identified using an identifier of the content provider or source for the multimedia content (e.g., IP address, MAC address, etc.) As it is contemplated that management server 410 or 201 may perform various methods described herein for a plurality of client devices 411-414 or 240, the identification in step 504 may facilitate the management server to look up previous requests sent by the client and/or metadata associated with communication to and/or from the client. Furthermore, the identification of the sought after multimedia content may enable the management server to query storage 404 for the multimedia content or to upload from an external source (e.g., another server, content provider, etc.).

For example, at step 506, management server 410 or 201 may assess whether multimedia content is stored locally (e.g., in storage 404). For example, management server 410 or 201 may periodically download or upload multimedia content requested by various client devices 411-412 or 240 and store it in storage 404. A local storage of the multimedia content may confer advantages at least in the form of efficiency for the methods described herein because it may be likely that other client devices 411-412 or 240 may request the multimedia content again, especially, if it is a trending or popular multimedia content. If the multimedia content is not stored locally, management server 410 or 201 may receive the multimedia content from a content provider (e.g., as in step 508) or another server. Receiving the multimedia content may comprise receiving a digital copy of a multimedia content file, or digitizing a physical copy of the multimedia content file. Alternatively or additionally, receiving the multimedia content may involve capturing a radio, television, cable, or satellite broadcast.

Upon receiving the multimedia content, management server 410 or 201 may generate a plurality of chunks (e.g., as in step 510). The chunks may be generated according to methods known to those having ordinary skill in the art. For example, a component of management server 410 or 201 (e.g., an encoder) may generate a plurality of chunks each having a fixed duration. Alternatively or additionally, the chunks may be generated with a fixed file size. In some embodiments, the chunks of the multimedia content may be set to have a preconfigured indicia or level of quality, or may be set to have the highest possible quality. In further embodiments, the quality or other configurations of the chunks may be automatically set according to the bandwidth or network connectivity of the client devices 411-414 or 240 and/or management server 410 or 201, or in response to standards set by the content provider.

Each chunk may have an identifier that may indicate sequential data, e.g., where the chunk fits in sequentially with other chunks of the multimedia content. For example for video content, a chunk's sequential data may indicate where the chunk fits in chronologically in the video sequence. Thus, at step 512, management server 410 or 201 may arrange the chunks based on this sequential data. Furthermore, step 514 may include storing the arranged chunks into memory 404, e.g., for retrieval during methods presented herein. For example, with the arranged chunks stored, the management server may determine, e.g., at step 506, that the multimedia content is stored locally, and management server may perform step 516 as described below.

Therefore, if it is determined that the multimedia content was stored locally (e.g., at step 506), step 516 may include identifying the sequential data of the requested chunk. In some embodiments, other identifying information of the chunk may be determined from the received request for the chunk. The sequential and other identifying information may be used to locate, query, and/or retrieve the stored chunk in steps presented herein.

Step 518 may include determining whether the requested chunk is the first requested chunk for the multimedia content, by the identified client device. Determining that a requested chunk is the first requested chunk for a multimedia content may be advantageous for the efficiency of the systems and methods presented herein as this may facilitate a quicker retrieval of the requested chunk, and the requested chunk may be a stored chunk of a default quality. It is contemplated that during the initial request by a client device 411-414 or 240 for multimedia content, the request for a chunk of the multimedia content would be the client's first requested chunk of the multimedia content. In such embodiments, step 532 may include sending the appropriate stored chunk, which would be the chunk designated as first chunk, to the client device. However, the client's first requested chunk need not be a chunk that is first in chronological sequence of the chunks of the multimedia content. For example, it may be possible that the first requested chunk would be of a chunk that is in an arbitrary place, sequentially, if the multimedia content were to be segmented into a sequence of chunks.

Alternatively or additionally, at step 520, management server 410 or 201 may look up and/or identify an indicia of quality of a stored chunk corresponding to the requested chunk. Thus, step 520 may include using information obtained in preceding steps, e.g., sequential and other data of the requested chunk in step 516 and an identifier of the multimedia content from step 504. The management server may use the information to search, e.g., within its temporary storage, for stored chunks belonging to the identified multimedia content. After retrieving a list of chunks for the multimedia content, the management server may look for a stored chunk having the same sequential or other identifying information as the requested chunk. Upon identifying the corresponding chunk, the management server may retrieve metadata of that stored chunk, which may include, but is not limited to, an indicia of quality of the stored chunk. The indicia of quality may include, for example, the bitrate, pixels, etc., of the stored chunk. In some embodiments, the retrieved metadata, including the indicia of quality, may be stored temporarily for further retrieval or reference in subsequent steps.

Figure 6:
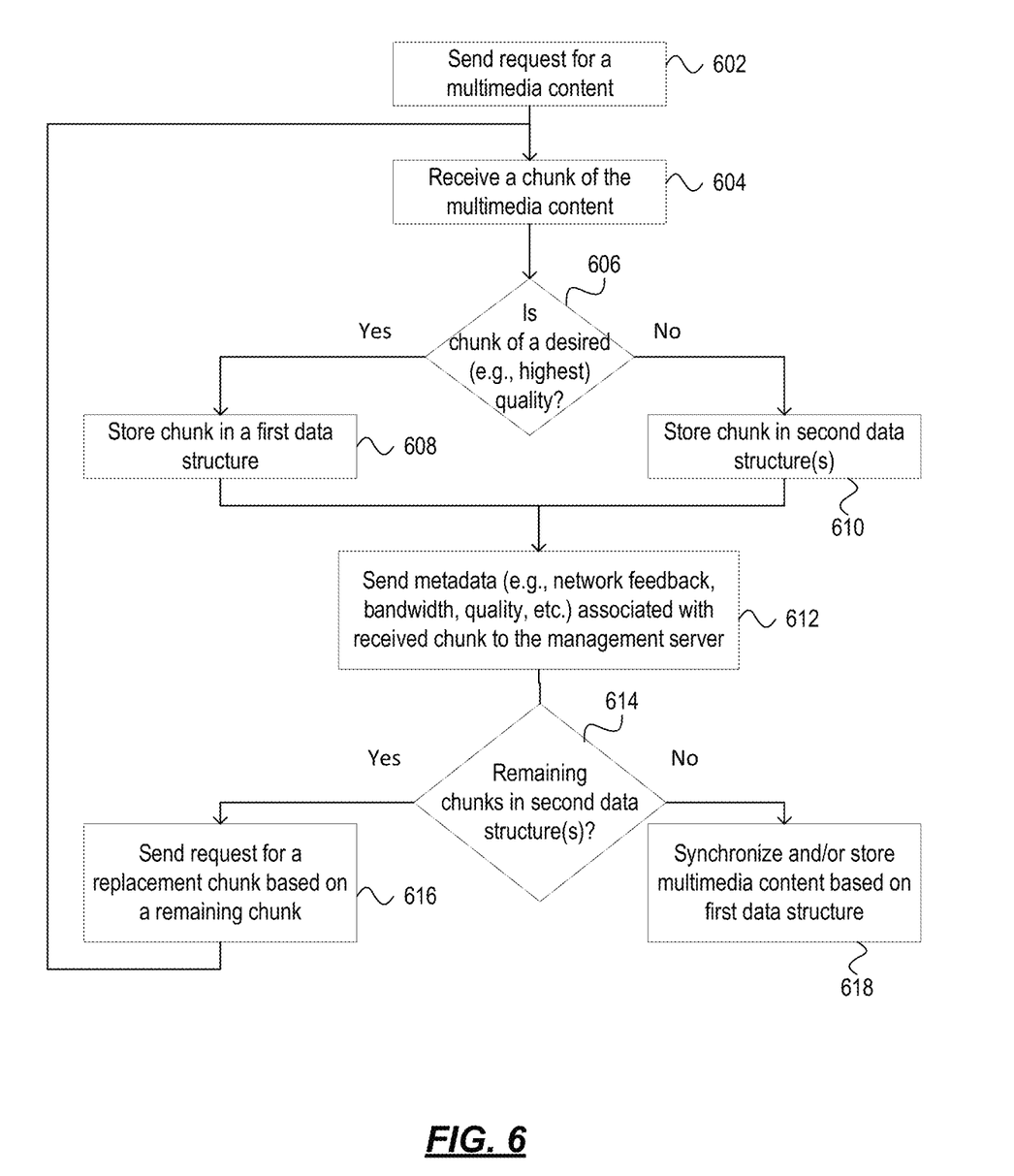
FIG. 6 depicts an illustrative block diagram for a bandwidth efficient method to stream and sync multimedia content at a desired quality of experience (QoE) performed by a computing system or device of an end-user, in accordance with one or more illustrative aspects described herein.

Step 522 may include determining whether the request is for a replacement chunk. For example, client computing device may have determined, e.g., via method 600 as depicted in FIG. 6, that a previously received chunk for a requested multimedia content was not of a desired or ideal quality, and therefore should not be stored (e.g., synced) to the client computing device, even though the chunks were of adequate quality for a user of the client to stream the multimedia content. Subsequently, the request for a chunk in step 502, may be for a chunk of an ideal or desired quality to replace the chunk that the client computing device had determined was not of the desired or ideal quality. If the request is for a replacement chunk, step 536 may include determining the quality that is requested for in the replacement chunk. For example, an ideal or desired quality may be the highest or default quality if network connectivity with or bandwidth of the client computing device were in optimal condition. In some embodiments, information regarding the requested quality may be received with or be a part of the request of the replacement chunk. In another embodiment, the management server may determine the quality based on the current bandwidth or network connectivity of the client computing device. In further embodiments, the quality requested may be assumed to be the highest or ideal quality, or a predetermined level of quality. Once the management server determines what quality that the client device is requesting of for the replacement chunk, step 538 may prompt the management server to determine whether a corresponding chunk of that quality is stored locally. It is contemplated that a plurality of chunks were already generated at a default or preconfigured quality, e.g., at step 510 whenever a multimedia content is received, e.g., at step 508. In some embodiments, the preconfigured or default quality at which the plurality of chunks were generated may not match the appropriate quality requested for in step 536.

Thus, if there is no chunk with the appropriate quality stored locally, step 540 may include regenerating a chunk at the determined appropriate quality. In some embodiments, step 540 may include using a corresponding chunk of a higher quality and duplicating the chunk by encoding the chunk using a lower bitrate. Step 540 may be performed using an encoder or other module or application of management server 410 or 201. Furthermore, the newly generated chunk may be stored in memory for future retrieval. Thereafter, the chunk may be sent to the client device at step 532.

If the request is not for a replacement chunk, step 524 may include retrieving metadata associated with the transmission of the previously sent chunk. The metadata may include, but is not limited to: an indicia of quality or other configuration of the previously sent chunk, network connectivity or bandwidth of the client device or management server during the transmission of the previously sent chunk, the network connectivity or bandwidth of the client device or management server during the reception of the request for the previously requested chunk, and etc.

Step 526 may include comparing the quality of the previously sent chunk with that of the stored chunk. The previously sent chunk may be the most recent chunk sent by the management server to the client device. In various embodiments, a "quality" of a chunk, or an "indicia of quality" of a chunk may refer to a quantifiable measure of an indicia that results in a greater quality of experience for a user. Examples of quality or indicia of quality may include, but are not limited, to a video or image resolution (e.g., in pixels), audio bit depth, or any quantifiable and noticeable effect on a multimedia content as a result of a change in bit rate.

Step 528 may include determining the network feedback of the previously sent chunk. The network feedback may be received by management server 410 or 201 from the client computing device to which the chunk was sent. The network feedback may include information pertaining to the network connectivity and bandwidth of the client computing device during transmission of the previously sent chunk. It is contemplated that during a client computing device's "idle time," the client computing device may have greater bandwidth and/or higher network connectivity. In various embodiments presented herein, the bandwidth of a device may refer to a channel capacity for a rate of data transfer to the device. The bandwidth may be affected by or associated with the network connectivity between the client device 411-414 or 240 and management server 410 or 201. The network feedback from the client device after a chunk was sent may be associated with the chunk and saved along with other information pertaining to the chunk as metadata in storage 404 of management server 410.

Step 530 may include determining whether there is a need for a quality shift. In various embodiments, a quality shift may refer to a generation or retrieval of a requested chunk that is of a different quality than the chunk most recently sent by the management server to the client device. If no quality shift is needed, e.g., if it is determined that the requested chunk should be delivered in the same quality as the preceding chunk, step 532 may include sending the appropriate stored chunk to the client device. Requested chunks (including replacement chunks) may be transmitted to the client device on an individual basis or in groups. In one embodiment, the chunks may be sent in the order in which individual requests for the chunks were requested. If the management server determines that a quality shift is needed, however, steps 536, 538, and 540 may be repeated, as described above.

Step 534 may include receiving and/or storing metadata associated with the sent chunk. In various embodiments, metadata may include information regarding network connectivity, bandwidth of the client device, and other network characteristics during the transmission of the chunk. Metadata may also include identifying characteristics about the chunk, for example, an identifier of the multimedia content of which the chunk is a part of, an indicia of quality of the chunk, file size, etc. In some embodiments, the metadata may further include temporal and geographical details, e.g., the time of transmission and location of the client device. Receiving and/or storing such metadata may allow the management server to be informed of a client device's current network connectivity and/or bandwidth, which may facilitate the bandwidth efficient synching and streaming of multimedia content, as described herein.

FIG. 6 depicts an illustrative block diagram for a bandwidth efficient method (i.e., method 600) to stream and sync multimedia content at a desired quality of experience (QoE) performed by a computing system or device of an end-user, in accordance with one or more illustrative aspects described herein. In some embodiments, method 600 may be performed by client devices 411-414, as depicted in FIG. 4, or client machines 240, as depicted in FIG. 2, to stream and/or sync the multimedia content according to methods presented herein.

Step 602 may include sending a request for a multimedia content. The request may be transmitted electronically, for example, to management server 410, and may include an identifier (e.g., IP address, web address, etc.) of the multimedia content for management server 410 or 201 to obtain, e.g., from a content provider, and/or locate within an internal storage. The internal storage may be a part of management server (e.g., memory 215). The request for a multimedia content may be based on a user input into client device 411-414 or 240 to select a multimedia content to stream and/or sync.

Step 604 may include receiving a chunk of the multimedia content. In some embodiments, sending a request for a multimedia content may implicitly result in a request to begin sending chunks of the multimedia content. It is contemplated that prior to receiving the chunk in step 604, management server 410 or 201 may have generated a plurality of chunks for the requested multimedia content. As has been mentioned in the detailed description of FIG. 5, the first chunk requested by client device need not be the first sequential chunk in the multimedia content. In some embodiments, the client device may receive multiple chunks, e.g., when the management server sends chunks in bulk.

In some embodiments, prior to receiving the chunk, client device 411-414 or 240 may send management server data (or pings) related to the client device's network connectivity or bandwidth. In further embodiments, this data ("network feedback") may be sent by the client device periodically or continually, or at preconfigured points. In some embodiments, the chunks may be of varying quality and may depend on network connectivity and bandwidth information of the client device received by management server 410 or 201. In other embodiments, the first chunk may be of a default quality (e.g., highest quality) generated by the management server, irrespective of the client device's network feedback. In such embodiments, the management server may gage the network connectivity and/or bandwidth of the client device after the transmission of the first chunk. Subsequent chunks may have qualities and/or bitrates that are customized depending on network feedback received by the management server.

Step 606 may include deciding whether the received chunk is of a desired quality. It is contemplated that the desired quality would typically be the highest possible quality. In some embodiments, the highest possible quality of the chunk may refer to the quality of the chunk that would be received by the client device if the client device were to have optimal network connectivity and bandwidth. A client device may have optimal network connectivity and bandwidth during "idle time", e.g., when the client device has not allotted its network bandwidth for any other significant transmission of data, including data pertaining the received multimedia file. For example, if a client device is not streaming or syncing any other content externally, a client may have "idle time" and optimal network connectivity and bandwidth. In some embodiments, the desired quality would be the quality at which that the management server has stored the chunk, without downgrading. In various embodiments, downgrading may refer to a regeneration of a chunk of a multimedia content at a lower quality level. It is also contemplated that if multiple chunks are received in step 604, step 606 may include deciding whether each of the multiple chunks is of the desired quality.

If the received chunk is of the desired quality, the chunk may be stored in a first data structure of client device, e.g., at step 608. If the received chunk is not of the desired quality, step 610 may include storing the chunk in data structure(s) that are different or distinguishable from the first data structures (e.g., "second data structure(s)"). In various embodiments, a data structure may refer to any organization of data to enable efficient access and modification. The separation of the chunks into second data structure(s) may serve the purpose of distinguishing the chunks that are not of the desired quality from the chunks that are of the desired quality. Furthermore, chunks stored in the first data structure may be associated with a high-quality flag and chunks in the second data structure may be associated with lower-quality flags. The flags may serve to indicate a quality of the chunk. In some embodiments, the flags may be binary (e.g., high quality or not high quality). In further embodiments, the flags may further differentiate quality levels, and thereby indicate a ranking of qualities. Thus, the flags may allow the management server to determine which chunks to request for a replacement, e.g., chunks with the lowest quality first. In some embodiments, instead of storing a file that comprises of the chunk, a mere identifier or metadata of the chunk may be stored. By storing merely an identifier or metadata of the chunk, client device, and indirectly the systems described herein, may be able to more efficiently use its processor and perform the methods described herein. In some embodiments, while files of the chunks that meet the desired quality may be stored in the first data structure, identifiers and/or metadata of the chunks that do not meet the desired quality may be stored in the second data structure(s). Alternatively or additionally, the chunks (or their identifiers and/or metadata) that are not of the desired quality may be queued and/or stored temporarily in the second data structures(s), e.g., to be removed or deleted in subsequent steps. It is contemplated that "second data structure(s)" may comprise a plurality of data structures that may further categorize the chunks, or its identifiers and/or metadata, hierarchically based on quality. Thus, there may be a third data structure for chunks that do not meet a lesser threshold of quality, a fourth data structure for chunks that do not meet an even lesser threshold of quality, and so forth.

Step 612 may include sending metadata associated with the received chunk to the management server. As described above, this metadata may include network feedback and/or bandwidth of the client device during any of the steps associated with the request for, transmission of, or storage of the chunks. For example, the bandwidth and/or network feedback may be affected by whether the user of the client device is streaming the multimedia content. If multiple chunks were received at step 604, step 606 and subsequent steps may be repeated for each of the remaining multiple chunks.

Step 614 may include determining whether there are remaining chunks (or identifiers of chunks) stored (or queued) in the second data structure(s). If there are, step 616 may include sending a request for a replacement chunk of at least one of the remaining chunks. For example, a replacement chunk may be requested for the chunk having the lowest quality in the second data structure(s). Each subsequent replacement chunk that is requested, e.g., after an iteration of steps described above, may be a chunk having the lowest quality in the second data structure(s) that has not yet been requested.

Various steps of method 600 may be repeated after the replacement chunk is received. Upon receiving the replacement chunk, the corresponding chunk of the undesired quality may be removed or deleted from the secondary data structure. In some embodiments, for example, where there are multiple data structures that comprise the second data structure(s) for varying levels of quality, step 614 may further involve determining whether there are remaining chunks (or identifiers of chunks) stored (or queued) in the data structure designated for chunks having the least quality, second to least quality, third to least quality, and so forth.

If there are no more chunks remaining in the second data structure(s), step 618 may include synchronizing and/or storing the multimedia content based on the first data structure. In some embodiments, the first data structure may itself be a part of the storage or repository for multimedia content that have been synced for the user of device 411-414 or 240 to play. In further embodiments, synchronizing may involve sequencing or linking chunks together, e.g., using sequential data of the chunks, as may be known to those having ordinary skill in the art. For example, the client device may have received chunks for a video in an order that is not chronological to how the chunks would be played in the video. Thus, synchronization may reorganize storage of the chunks or link the chunks together appropriately.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   receiving, at a client device, a multimedia file from a server device, the multimedia file including a plurality of chunks, wherein the chunks are of varying quality;
   streaming the multimedia file based on the received plurality of chunks;
   determining, by the client device, a first subset of the plurality of chunks that meet a quality threshold, and a second subset of the plurality of chunks that do not meet the quality threshold;
   performing, in response to determining that a bandwidth characteristic satisfies a threshold, two or more iterations of:
      identifying, by the client device, a lowest quality chunk of the second subset;
      requesting, by the client device and from the server device, a replacement chunk for the lowest quality chunk of the second subset;
      receiving, by the client device and from the server device, the replacement chunk for the lowest quality chunk of the second subset, wherein the replacement chunk meets the quality threshold; and
      replacing, by the client device, the lowest quality chunk of the second subset with the replacement chunk; and
   after performing the two or more iterations, storing the multimedia file.

2. The method of claim 1, wherein the replacement chunk is requested while the client device is idle.

3. The method of claim 2, further comprising determining that the client device has become idle based on an amount of time that has lapsed during which the client device is not streaming the multimedia file.

4. The method of claim 1, wherein the plurality of chunks is received using an adaptive bit rate protocol.

5. The method of claim 1, wherein the quality threshold is at least 1080p.

6. The method of claim 1, further comprising storing a quality flag associated with each chunk, the quality flags associated with chunks of the first subset indicating a high-quality and the quality flags associated with chunks of the second subset indicating a low-quality.

7. The method of claim 1, wherein each subsequent replacement chunk requested after a first iteration of the two or more iterations is that of the lowest quality chunk in the second subset that has not yet been requested.

8. The method of claim 1, wherein, after performing at least one of the two or more iterations, the second subset of the plurality of chunks consists of zero chunks.

9. One or more non-transitory computer readable storage media comprising computer readable instructions that, when executed, cause a client device to:
  receive a multimedia file from a server device, the multimedia file including a plurality of chunks, wherein the chunks are of varying quality;
  stream the multimedia file based on the received plurality of chunks;
  determine a first subset of the plurality of chunks that meet a quality threshold, and a second subset of the plurality of chunks that do not meet the quality threshold;
  perform, in response to determining that a bandwidth characteristic satisfies a threshold, two or more iterations of:
    identifying, by the client device, a lowest quality chunk of the second subset;
    requesting, from the server device, a replacement chunk for the lowest quality chunk of the second subset;
    receiving, from the server device, the replacement chunk for the lowest quality chunk of the second subset, wherein the replacement chunk meets the quality threshold; and
    replacing, by the client device, the lowest quality chunk of the second subset with the replacement chunk; and
  after performing the two or more iterations, store the multimedia file.

10. The computer readable storage media of claim 9, wherein the replacement chunk is requested while the client device is idle.

11. The computer readable storage media of claim 10, wherein the computer readable instructions further cause the client device to determine that the client device has become idle based on an amount of time that has lapsed during which the client device is not streaming the multimedia file.

12. The computer readable storage media of claim 9, wherein the plurality of chunks is received using an adaptive bit rate protocol.

13. The computer readable storage media of claim 9, wherein the quality threshold is at least 1080p.

14. The computer readable storage media of claim 9, wherein the computer readable instructions further cause the client device to store a quality flag associated with each chunk, the quality flags associated with chunks of the first subset indicating a high-quality and the quality flags associated with chunks of the second subset indicating a low-quality.

15. The computer readable storage media of claim 9, wherein each subsequent replacement chunk requested after a first iteration of the two or more iterations is that of the lowest quality chunk in the second subset that has not yet been requested.

16. The computer readable storage media of claim 9, wherein, after the computer readable instructions cause the client device to perform at least one of the two or more iterations, the second subset of the plurality of chunks consists of zero chunks.

17. A method, comprising:
  receiving, by a server device and from a client device, a request to stream a multimedia file hosted by the server device;
  transmitting, from the server device to the client device, the multimedia file as a plurality of chunks, wherein the chunks are of varying quality responsive to feedback regarding an available bandwith of the client device; and
  performing, in response to determining that the available bandwith of the client device satisfies a threshold, two or more iterations of:
    receiving, by the server device and from the client device, a request to download a replacement chunk for a previously successfully transmitted chunk, wherein the previously successfully transmitted chunk did not meet a quality threshold; and
    transmitting, from the server device to the client device, the replacement chunk, wherein the replacement chunk meets the quality threshold.

18. The method of claim 17, wherein the plurality of chunks is transmitted using an adaptive bit rate protocol.

19. The method of claim 17, wherein the quality threshold is at least 1080p.

20. A system comprising
  one or more processors; and
  memory storing computer-executable instructions that, when executed by the one or more processors, cause the system to:
    receive, at a client device, a multimedia file from a server device, the multimedia file including a plurality of chunks, wherein the chunks are of varying quality;
    stream the multimedia file based on the received plurality of chunks;
    determine, by the client device, a first subset of the plurality of chunks that meet a quality threshold, and a second subset of the plurality of chunks that do not meet the quality threshold;
    perform, in response to determining that a bandwidth characteristic satisfies a threshold, two or more iterations of:
      identifying, by the client device, a lowest quality chunk of the second subset;
      requesting, by the client device and from the server device, a replacement chunk for the lowest quality chunk of the second subset receiving, by the client device and from the server device, the replacement chunk for the lowest quality chunk of the second subset, wherein the replacement chunk meets the quality threshold; and
      replacing, by the client device, the lowest quality chunk of the second subset with the replacement chunk; and after performing the two or more iterations, store the multimedia file.

\* \* \* \* \*